Nov. 7, 1967 G. T. SHIMABUKURO 3,351,917

INFORMATION STORAGE AND RETRIEVAL SYSTEM HAVING A DYNAMIC MEMORY DEVICE

Filed Feb. 5, 1965 5 Sheets-Sheet 1

INVENTOR.
GEORGE T. SHIMABUKURO

BY Christie, Parker & Hale

ATTORNEYS

INVENTOR.
GEORGE T. SHIMABUKURO
BY Christie, Parker & Hale
ATTORNEYS.

INVENTOR.
GEORGE T. SHIMABUKURO
BY
Christie, Parker & Hale
ATTORNEYS.

United States Patent Office 3,351,917
Patented Nov. 7, 1967

3,351,917
INFORMATION STORAGE AND RETRIEVAL SYSTEM HAVING A DYNAMIC MEMORY DEVICE

George T. Shimabukuro, Monterey Park, Calif., assignor to Burroughs Corporation, Detroit, Mich., a corporation of Michigan Filed Feb. 5, 1965, Ser. No. 430,599
26 Claims. (Cl. 340—172.5)

This invention relates in general to information storage and retrieval systems and more particularly relates to a new and novel method and apparatus for writing, shifting, and reading both destructively and nondestructively from a memory device. In one particular embodiment, the invention is directed to performing the above-stated storage and retrieval operations in a dynamic memory loop, including tandem-connected and pulse-controlled storage devices.

One well-known form of a dynamic memory is an acoustic delay line which is provided with input and output signal applying circuits which are connected together to form a circulating information loop. Signals in such a loop are stored in the delay line by applying such signals to the delay which propagates them for the delay's time interval, and thereafter these propagated signals are recovered by the output circuit and are applied back to the input of the delay line. This continual recirculation provides a temporary storage in the information loop which is often provided with gating devices that are operative for inserting and removing information from the delay memory. These recovered information signals may be processed by a utilization circuit, such as a computer, and then returned to the circulating information loop. A system of this type is described in the text entitled "High Speed Computing Device" by the Engineering Research Associates at pp. 341 through 348, published by McGraw-Hill Book Company, Inc., in 1950.

The gating devices of the aforementioned prior art circuit include input and output and clocking gates which are connected to the dynamic delay and its input and output driving circuits. In such systems, whenever information is to be operated on, i.e., written, erased, read or shifted by a processing system, such as a computer, the output gate is enabled. This gate controls the course of the stream of information pulses propagated by the delay and diverts this information stream into an area of the computer where such pulses are analyzed as to address and information content. The address analysis in the prior art operation requires that a counting circuit in the computer be monitored in order to define the first information pulse introduced into the circulating information loop. Using this pulse as a reference, every pulse introduced thereafter is synchronized with this counter in order to provide a way of knowing the location or address of every pulse. The use of the computer's pulse counter and other associated counters operating in the described manner provides a method for establishing a continual identification of the location of each information pulse and of characters made up of several pulses and of words made up of several characters. If a "stack" memory operation is desired by the processing computer, i.e., an operation in which only the first or last pulses introduced are progressively operated on, the information counter will locate the first and last pulse or bits of information that have been introduced into the re-circulating loop, and will apply, at the proper instant, an enabling pulse to the input or output gate so that the first or last pulse may be recovered or new information inserted in the circulating loop. In the case of a destructive read operation of the stack memory, the processing computer requires that another counter or memory record the fact that one bit of information has been recovered, and thus the count of the original number of information bits must be reduced. In the case of a write operation this additional counter must record that the number of information pulses has increased. This prior art approach presents a complex operation which wastes considerable time and circuitry, ties up portions of the computer during recovery operations before the desired position of the stored information can be ascertained, and thus is undesirable.

Furthermore, it is often necessary to accomplish nondestructive read outs and shifting of information bits within the circulating loop. Attemps have been made to adapt the above-mentioned prior art apparatus to achieve these letter operations by adding a second memory and information comparison circuit. These circuits operate to recover the circulating information at the proper time, store it in one circuit, and re-arrange the stored information until a comparison operation denotes that the desired shifting or transposing of information digits has taken place. Thereafter, the altered information is re-inserted in the information loop. These attempts have, in general, been unsuccessful and present numerous disadvantages, as they involve complex circuitry which requires precise timing; and furthermore the past approaches introduce considerable chance of losses and errors in the information because it must be removed from the circulating loop, operated on, and thereafter re-inserted in the altered sequence.

The system of this invention overcomes the above-mentioned disadvantages of the prior art and provides a simple and efficient circuit that can write, erase, shift or transpose information digits and read, both destructively and nondestructively. Further, this invention can readily provide output indications which define the capacity status of the information loop while it is in operation. This latter operation in the prior art approach has required still an additional counting device or memory which keeps track of the number of bits inserted into the re-circulating loop as compared to the total capacity for that loop.

The information storage and retrieval system of this invention includes a loop for continually circulating information, which loop includes a dynamic memory device and associated input and output drivers which are series-connected to tandem pulse controlled storage devices that are present in the circulating loop. Means are provided for inserting unique identifying characters in the circulating loop which identify the beginning and the end of an information pattern therein. A decoding circuit is connected to the tandem storage devices which is operative for delivering output indications in a preselected pattern, at the instant when one of the unique identifying characters which have been circulated through the delay is stored in the tandem storage devices. Logic gating circuitry is connected between the output leads from the decoding device and a command circuit of a processor, and is responsive to an operational command and a decoding output indication, for altering the information pattern adjacent to the unique identifying character sensed by the decoding circuit.

In one particular embodiment of this invention, the storage devices comprise a pair of tandem-connected shift registers which are pulse controlled, to continually shift binary coded information in said loop, and are further controlled by an addressing means to insert in said loop two unique characters which mark the beginning and end of the binary coded information train.

Each identifying character has a decoding circuit which is arranged to respond by an output indication only to that character, and one each of these decoding circuits is connected to the output of one each of the register pair. Detector means are connected to these decoder outputs and are also connected to a source of control signals which define one operation from among several preselected information altering operations, such as a nondestructive or destructive read, a write, or digit transpose, and a read and backspace operation from either end of the information pattern. In every case, however, the detector means controls an information altering means which performs the commanded operation during the time while all information other than the stored unique character and the adjacent information to be altered is circulating in the delay. Automatic recirculation of all information thereafter occurs, and the desired operation has been accomplished in accordance with the principles of this invention, without complex counting circuitry, and this accomplishment is fulfilled in an exceedingly short time interval and without undue chance for information errors because the information never leaves the circulating information loop.

Further, additional circuitry in accordance with the principles of this invention, monitor the decoder outputs as the unique identifying characters pass through each register, and are operative for enabling appropriate indicating devices that signal the capacity status of the information loop.

This additional status indicating circuitry includes an "empty" and a "full" indicator circuit, each of which is connected by a detector to the decoder outputs and initially responds by signalling the status capacity of the loop, only when both unique characters appear together in the shift registers. The "full" and "empty" indicating circuits respond to opposite orders of concurrent appearances of these unique characters. This status indicating circuitry further includes a "near-empty" and a "near-full" indicator circuit, each of which is connected by a detector and time delay circuit combination to the decoder outputs, and deliver their initial and appropriate status capacity signals only when both unique characters have appeared in a defined order in a single shift register within the different timing cycles established for each indicator by its delay circuit. Reset means are provided for all indicators in order to provide a continual up-to-date indication of the capacity status of the information circulating loop.

These and other features of the present invention will be more fully appreciated when considered in light of the following specification and drawing in which.

Referring now to the information storage and retrieval system of FIG. 1, the general organization of an information processing system including the principles of this invention will be described. A circulating loop for information storage is shown which comprises a dynamic memory device 10, which may be any of the well known delay lines of the prior art, and including a read and write amplifier which operate to assure that a signal applied at the input of the delay line by the write amplifier is recovered by the read amplifier at some later finite time interval.

Information for the circulating loop is in the form of pulses which represent binary "ones," as would be provided by a digital computer shown in block form as processor control 12. These "ones" reappear at the output of the delay line 10 without any appreciable distortion or attenuation. Binary "zeros" are represented by the absence of both an input and an output pulse for the delay line. Each "zero" or "one" is termed a bit and numerous delay lines are available commercially with capacities in the range of 50,000 such bits.

The foregoing bit capacity of a delay line is a function of many variables, of which is included the bit time interval, or time between introduction of successive bits to the input of the delay line. This bit time interval controls the data rate or pulse repetition rate for the circulating loop, and also must be equal to the pulse repetition rate for the first and second storage devices 14 and 15, respectively, to achieve maximum storage and efficiency. Thus, it is required that the storage devices operate at the same data rate as the delay memory.

Figure 1:
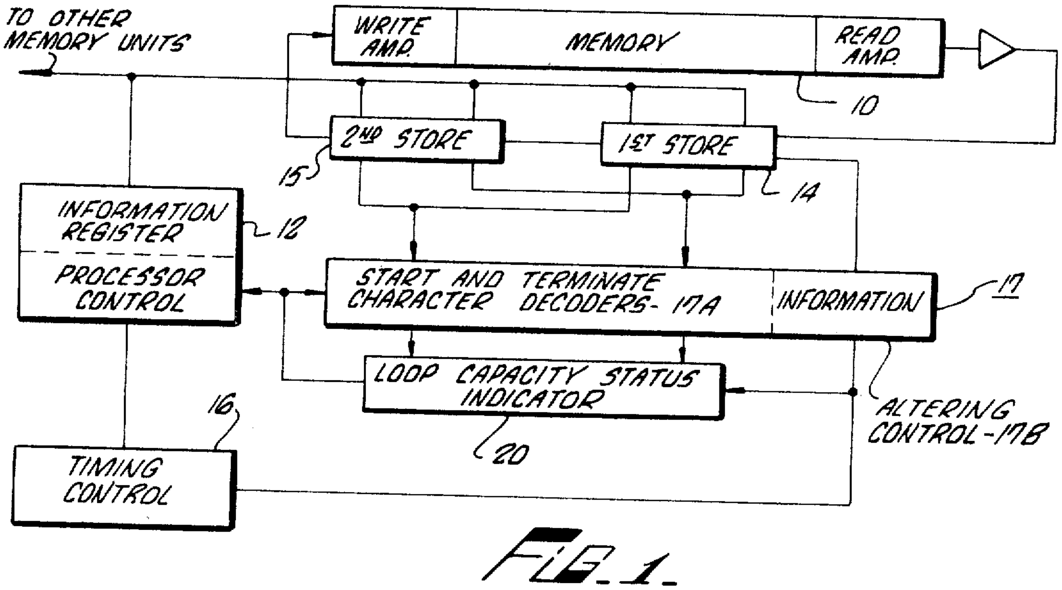
FIG. 1 is a schematic representation of a typical information storage and retrieval system embodying the principles of this invention.

In the serial operation for the circulating information loop of FIG. 1, every information pulse stored by the delay memory 10 passes through the tandem-connected storage devices 14 and 15, which are regulated by the timing control 16 which is connected to the storage devices through control circuit 17. The control circuit 17 includes a start and terminate character decoder circuit 17A and an information altering control circuit 17B. The decoders are preselected to respond only to the two unique characters that are inserted in the information circulating loop by processor 12, and which define the beginning and end of an entire information pattern in that loop. Each decoder responds with an output indication only to either the start or to the terminate character when such characters are stored in circuits 14 and 15. The output indication from one of the decoders is combined with process commands from the process control circuit 12 to accomplish various reading, writing and shifting operations. These operations will be described in greater detail hereinafter.

Additionally, the outputs from these decoders are applied to a loop capacity status indicator 20. This indicator circuit 20 responds to the outputs of the start and terminate character decoders in order to signal the processor control circuit 12 whether or not the memory 10 is "full," "near-full," "empty" or "near-empty." These status indicating operations and circuit details of indicator 20 will be described hereinafter in connection with FIGS. 4 and 6.

Figure 2:
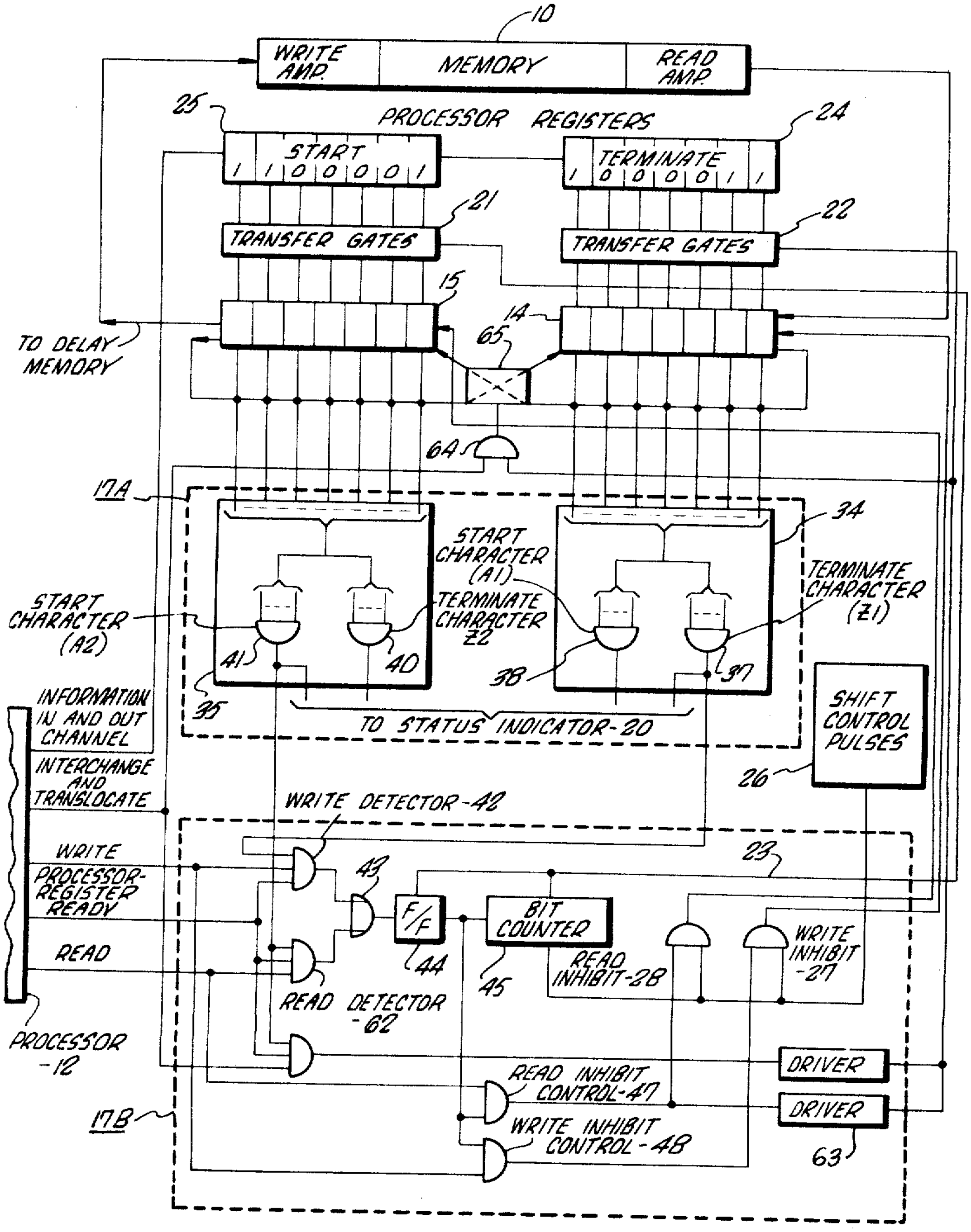
FIG. 2 is a schematic representation of circuitry for performing reading and writing operations in accordance with the principles of this invention.

Certain portions of the circuitry of FIG. 1 are repeated in FIG. 2 and include for example details of the start and terminate decoder circuits 17A, the information altering control 17B, the first and second storage devices 14 and 15, and processor 12 which is repeated in block form. In addition, information processor registers 24 and 25 which are associated respectively with the first and second storage devices 14 and 15 are shown connected to these storage devices by information transfer gates 21 and 22.

Processor circuit 12 regulates several different modes of operation for the memory system of FIG. 2, as indicated by the commands on the output leads which connect processor 12 to the information altering circuit 17B, and to information registers 24 and 25. These control commands from processor 12 are directed particularly to a stack memory system operation for the circuit of FIG. 2, although the principles of this invention are not limited to such a memory system as will be made clear hereinafter.

In a stack memory operation, binary input information is stored serially into a storage device and is recovered by an operation referred to as a fi-fo, or first-in and first-out operation. A similar principle is employed in stack memories for recovering out first the bit of information which was stored last. The stack memory operation also often requires a non-destructive readout in which either the first or last bit of information is read and relocated in the storage device in order to make it available to the processing circuits for subsequent operations which may include another readout operation if the processing circuit should fail correctly to recover the information.

Circuitry of FIG. 2, in accordance with the principles of this invention performs write and read operations, both in a destructive and non-destructive mode, as well as a shifting operation which is hereinafter referred to as read and back spacing. These operations are performed by unique circuitry operating in a new and novel manner heretofore unknown to the prior art. In accordance with this invention, *all* information processing operations revolve around two unique characters which are referred to hereinafter as the start and terminate characters. These characters are initially inserted by the processor 12 into the processor registers 24 and 25 prior to a normal information circulating operation. The start and terminate characters are comprised of any two different desired patterns of binary bits so long as these two patterns are excluded from the binary bit combinations available for the remaining information. Two such configurations for exemplitive purposes only are shown in registers 24 and 25 for the start and terminate characters.

To initiate a circulation operation for the circuit of FIG. 2, the processor unit 12 inserts the start and terminate bits into the processor in and out registers 24 and 25, and gates these characters in parallel to the information loop registers 14 and 15. These information loop registers 14 and 15 may be any of the type well known in the art having a shift rate which is compatible with the data rate for the delay line memory 10 as controlled by a source of shift control pulses 26. These shift pulses are delivered to the registers 14 and 15 through normally enabled inhibit gates 27 and 28. Each shift register advantageously may have as many stages as there are bits in one of the unique characters, which is also the number of bits per character for standard information digits and characters. Each time a shift pulse from source 26 is applied to the tandem-connected registers 14 and 15, all the bits in the register are shifted one stage to the left, and a new bit is stored in the extreme right hand stage of register 14. As one bit is shifted out from the last stage of register 15, this bit is sensed by the write amplifier and is introduced into delay memory 10. A pulse introduced in this fashion propagates through memory 10 for a finite time interval until it is sensed by the read amplifier and is applied back to the first stage of shift register 14.

As mentioned hereinbefore, memory 10 is capable of storing approximately 50,000 of these information bits of which only 14 are shown in the registers 24 and 25 of FIG. 2. Inasmuch as the remaining information capacity for memory 10 is to be filled by information which is inserted between the start and terminate characters, it is necessary to control circulation of information in the loop in a manner that allows new information to be written and read from the loop with relationship to these start and terminate characters. Such operations on the information of the circulating loop are provided in accordance with the principles of this invention by utilizing a pair of decoders 34 and 35. Decoder 34 is connected to the parallel outputs of shift register 14 and comprises two portions 37 and 38, each of which may take the form of a single AND gate having its inputs connected to the shift register stages such that an output indication is delivered from AND gate 37 only when the terminate character is stored in shift register 14. In a similar manner AND gate 38 has its inputs connected to the shift register 14 in such a manner that an output indication will be delivered therefrom only when the start character is stored in shift register 14. Because this decoder 34 and its AND gates 37 and 38 are associated with the storage register 14 which initially contains the character marking the end of the information pattern in the information loop, and for sake of brevity, the termination character is designated as Z and the start character is designated as A. Accordingly, these characters A and Z are sensed by the decoders associated with the first register after the memory and the decoder's output indications are referred to as A1 and Z1. Decoder 35 which is associated with the second shift register 15 includes AND gates 40 and 41 which are identical respectively to AND gates 37 and 38 and deliver output indications referred to as A2 and Z2. Output indications from the gates 37 and 40, and 38 and 41, are applied to logic circuitry in a manner to be fully described hereinafter for controlling shifting of the registers 14 and 15 in a preselected manner, and for enabling the transfer gates 21 and 22 under the command of processor 12 for performing reading and writing operations.

The following table indicates the various operations for the circuit of FIG. 2, and is useful in indicating which character is sensed by the decoders for a particular command and what shifting and gating operation takes place in the information loop shift registers:

TABLE 1

| System Operation | Example | | Sensing Operation For Character Decoders | Action |
|---|---|---|---|---|
| | Before | After | | |
| (1) Write in last information position | A-1-2-3-4-Z | A-1-2-3-4-5-Z | Terminate Character (Z1). | Inhibit 14; shift 15; insert digit; and resume normal shifting. |
| (2) Destructive read from first information position. | A-1-2-3-4-5-Z | A-2-3-4-5-Z | Start Character (A2). | Inhibit 15; read 14; shift 14; and resume normal shifting. |
| (3) Non-Destructive read from first information position. | A-1-2-3-4-5-Z | 1-A-2-3-4-5-Z | (A2) | Read 14; interchange 15 and 14; and shifting never interrupted. |
| (4) Read and back space from first information position. | 1-2-3-A-4-5 | 1-2-A-3-4-5-Z | (A1) | Read 15; interchange 15 and 14; and shifting never interrupted. |
| (5) Read and back space from last information position. | A-1-2-3-4-Z-5 | A-1-2-3-4-5-Z | (Z1) | Read 15; interchange 15 and 14; and shifting never interrupted. |
| (6) Non-destructive read from last information position. | A-1-2-3-4-5-Z | A-1-2-3-4-Z-5 | (Z1) | Read 15; interchange 15 and 14; and shifting never interrupted. |
| (7) Destructive read from last information position. | A-1-2-3-4-5-Z | A-1-2-3-4-Z | (Z1) | Read 15; translocate 14 to 15; and shifting never interrupted. |

Each of the operations listed above in Table 1 will be described in detail under appropriate headings hereinafter in connection with FIGS. 2, 3, and 5.

*Write in last information position*

As indicated by the example given in row 1 of Table 1, a write operation for the circulating information loop of FIG. 2 may involve the insertion of an information character, such as digit 5, into the circulating information pattern. This information character may have seven binary bits, as do the start and terminate characters, although this number of bits is chosen merely for purposes of example and is not to be taken as limiting the principles of this invention. When the digit 5 is to be inserted into the circulating information loop, a momentary interruption of the shifting of the information loop shift register 14 takes place.

Processor 12 defines that a write operation is desired and also defines that the processor register 25 is in a loaded condition to perform the parallel insert of the digit 5 for a stack memory operation. As mentioned hereinbefore, the prior art operation required that a counter in the computer be monitored in order to insert the digit at the proper instant. In accordance with the principles of this invention, however, this counter operation is not required because the information loop registers and the decoders and storage control circuits automatically provide their own identification, and automatically cease the information flow at the proper instant, insert the desired digit, and resume the flow of information without any further interruption in the normal operation.

As the information in the loop is shifted through the loop shift registers 14 and 15, the decoder circuits 34 and 35 sense these registers for the presence of the start and terminating characters which are always present in the loop information. A write operation in the last information position requires that the termination character Z1 completely fill the loop register 14. This condition is determined by AND gate 37 of decoder 34 which applies an output indication to a write detector gate 42 and to the status indicator circuit 20. Reference to the action column of Table 1 shows that this write operation involves inhibiting shifting in loop register 14 during continued and a shifting in register 15, all prior to the enablement of the information transfer gates 21 which are connected between the process register 25 and the loop register 15. These transfer gates 21 and 22 may include one gate for each information bit to be transferred, and although they are shown separately from either resistors 15 and 25 and 14 and 24, they are often considered to be an integral part of well-known shift registers having parallel input and output leads, and an additional progressive information bit shifting lead.

In any event, the shifting and information insert operation is accomplished by the information altering control circuit 17A which comprises OR gate 43, control flip-flop 44, bit counter 45, write inhibit control gates 27 and 48, and transfer gate 21 which is controlled by the gate enablement lead 23 connected between the output of bit counter 45 and transfer gates 21. The circuit operation for these information altering control circuits may more fully be appreciated by reference to the timing chart for the write information operation depicted in FIG. 5.

Figure 5:
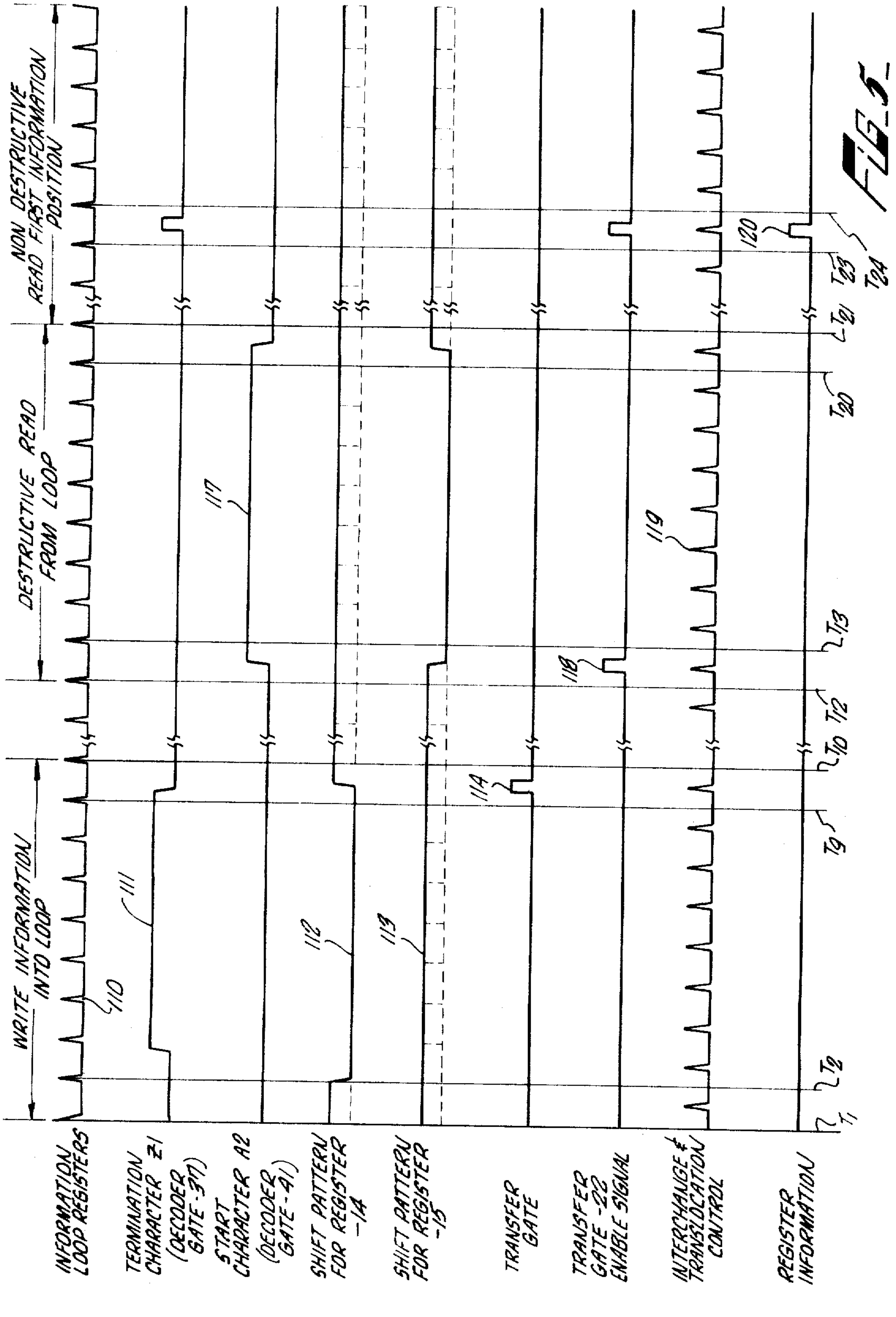
FIG. 5 is a timing chart and waveform diagram useful in depicting the circuit operation of FIG. 2.

At time $T_1$, as shown by FIG. 5, it is assumed that the shift pulses 110 are continually advancing the information in the loop in a sequential and repetitive manner until at time $T_2$ the termination character Z1 is fully stored by the shift operation in loop register 14. Presence of this termination character Z1 satisfies the input conditions for AND gate 37 which delivers an output indication 111 upon sensing Z1. Output 111 from decoder AND gate 37, as is well known, will occur a short interval after the shift operation which placed the termination character in register 14. Output 111 is applied to the input of write detector gate 42. This detector is a coincidence gate which has second and third input leads connected to processor 12. Two input terms, namely, a "write" and a "processor-register-ready" term, along with the coincidental appearance of output 111, satisfy gate 42 which applies an input signal through OR gate 43 to flip-flop 44. Flip-flop 44 normally presents a zero condition to bit counter 45 which, in a well known counting operation, requires a one insert before any count can take place. After a one input, counter 45 thereafter counts one unit for each shift pulse applied by shift control pulse source 26. The output of write detector 42 thus switches the state of flip-flop 44 so that a one condition is presented to bit counter 45, and a one condition is also presented to the read and write inhibit control gates 47 and 48, respectively. In this instance, the write inhibit control gate 48 has its input conditions satisfied by the write command from processor 12, and it, in turn, applies an inhibit signal to the write inhibit gate 27. This inhibit gate 27 prevents the shift pulses for register 14 from being delivered to that register by source 26. This inhibit condition for register 14 is shown in FIG. 5 as pulse wave 112.

The time duration for the inhibit operation of shift register 14 is equal to the amount of time necessary to shift out from shift register 15 one complete digit, which in this case, consists of seven binary bits of the previously last digit of information. Reference to waveform 113 of FIG. 5 shows that during this inhibit operation the shift pulses 110 shown in dashed lines in waveform 113 are being applied to shift register 15 in the information loop so that register 15 may be cleared for the parallel write operation from processor register 25 through information transfer gates 21. These transfer gates 21 are enabled by an enabling pulse applied on enablement lead 23 by bit counter circuit 45 after it completes its count of seven shift control pulses 110. This gate enabling pulse from bit counter 45 is shown as enablement pulse 114 shortly after time $T_9$ of FIG. 5. By this enablement of transfer gates 21 a parallel write operation takes place which inserts the information digit 5 into loop register 15 prior to the appearance of the next shift control pulse 110 at time $T_{10}$ as shown in FIG. 5. Simultaneously with the appearance of pulse 114 and the enablement of transfer gates 21, the flip-flop circuit 44 is reset, and presents a "zero" condition at its output terminal as controlled by feedback from the output of bit counter 45 which is connected to the set lead of flip-flop 44. When flip-flop 44 resumes its "zero" output condition the write inhibit control gate 48 is no longer enabled and accordingly the shift inhibit lead of write inhibit gate 27 is de-energized. This operation assures that at time $T_{10}$ as shown in FIG. 5, normal shifting of both loop registers 14 and 15 resumes, and the write operation in the last standard information position has been automatically performed by the circuitry of this invention.

*Destructive read from first information position*

Reference to the example of row 2 of Table 1 shows a circulating information pattern which consists of A–1–2–3–4–5–Z, which is to be read destructively as is typical of many stack memory operations. In this instance the start character A must completely fill the information register 15 so that a read operation in parallel from shift register 14 may take place between that register and the processor register 24. This read operation is depicted in FIG. 5, and is initiated at time $T_{12}$ when it is assumed that the start character is completely shifted into the loop register 15. This start character A2 satisfies the decoder AND gate 41 as shown by the pulse wave 117. The output wave 117 from the decoder circuit 41 and the read and processor-registers-ready commands from processor 12 satisfy the input conditions for the read detector AND gate 62 which in turn changes the conductive state of flip-flop 44 by a signal applied thereto through OR gate 43. This change in conductive state in flip-flop 44 repeats the operation described hereinbefore in that it initiates a counting sequence of seven for bit counter 45, and in this instance satisfies the enablement conditions for the read inhibit control gate 47. The output of this gate 47 in turn applies an inhibit pulse to gate 28 which assures that shift register 15 will not be shifted during this read operation. Simultaneously with initiation of the inhibit operation for the shift register 15, applies an enablement pulse 118 of FIG. 5 is applied to transfer gates 22 via the driver circuit 63, which is connected between the output of read inhibit control gate 47 and the information transfer gates 22. This driver circuit 63 may advantageously be any driver circuit well-known to the prior art which converts a ramp steady state input such as pulse 117 into a single driving pulse such as enablement pulse 118. Enablement pulse 118 at transfer gates 22 allows a parallel read operation to take place between loop register 14 and processor register 24. As shown by reference to FIG. 5, this read operation occurs between the shifting pulses occurring at times $T_{12}$ and $T_{13}$. Accordingly, prior to time $T_{13}$ shift register 14 has been emptied and these empty stages must be filled with the next digit of information in order that the information circulated in the loop is continuous.

The change in state of flip-flop 44 which initiated the read operation described above also initiated the count-of-seven sequence for bit counter 45 described hereinabove in connection with the write operation. This count-of-seven by bit counter 45 allows the shift control pulse source 26 to advance the next digit of information which is delivered during the time interval $T_{13}$ through $T_{20}$ to completely fill the loop register 14 at time $T_{20}$. At time $T_{20}$, following the count-of-seven by bit counter 45, flip-flop circuit 44 is reset to its "zero" output state and accordingly, at that time, the inhibit control signal for gate 28 is removed, and normal shifting resumes as indicated at time $T_{21}$ of FIG. 5. This resumption of normal information flow in the information loop results in the information pattern A–2–3–4–5–Z, and this information pattern is continually circulated by the information loop until processor 12 delivers another command to alter this information pattern.

*Non-destructive read from first information position*

Reference to row 3 of Table 1 gives an example of the information pattern both before and after the non-destructive read operation. As shown in the *After* column of Table 1, the digit 1 and the start character "A" are transposed. This operation takes place in a manner somewhat similar to the destructive read operation hereinbefore, and thus will not be discussed in length. Again, as in the case of a destructive readout operation, the start character A2 is monitored by the decoders, and when that character is fully stored in shift register 15, an output indication satisfies the read detector gate 62 and initiates, by pulse 119 between $T_{23}$ and $T_{24}$ an information altering operation, resulting in the enablement of information transfer gates 22. In this instance, however, rather than filling the stages of shift register 14 after the information has been read in the manner described hereinbefore for a destructive read operation, interchange gates 64 and 65 are enabled and an interchange function takes place which interchanges the information stored in register 15 for the information stored in register 14 and vice versa. This interchange operation takes place simultaneously with the read operation in a well known manner, and involves the interchange pulse 120 as shown between the times $T_{23}$ and $T_{24}$ of FIG. 5.

Figure 3:
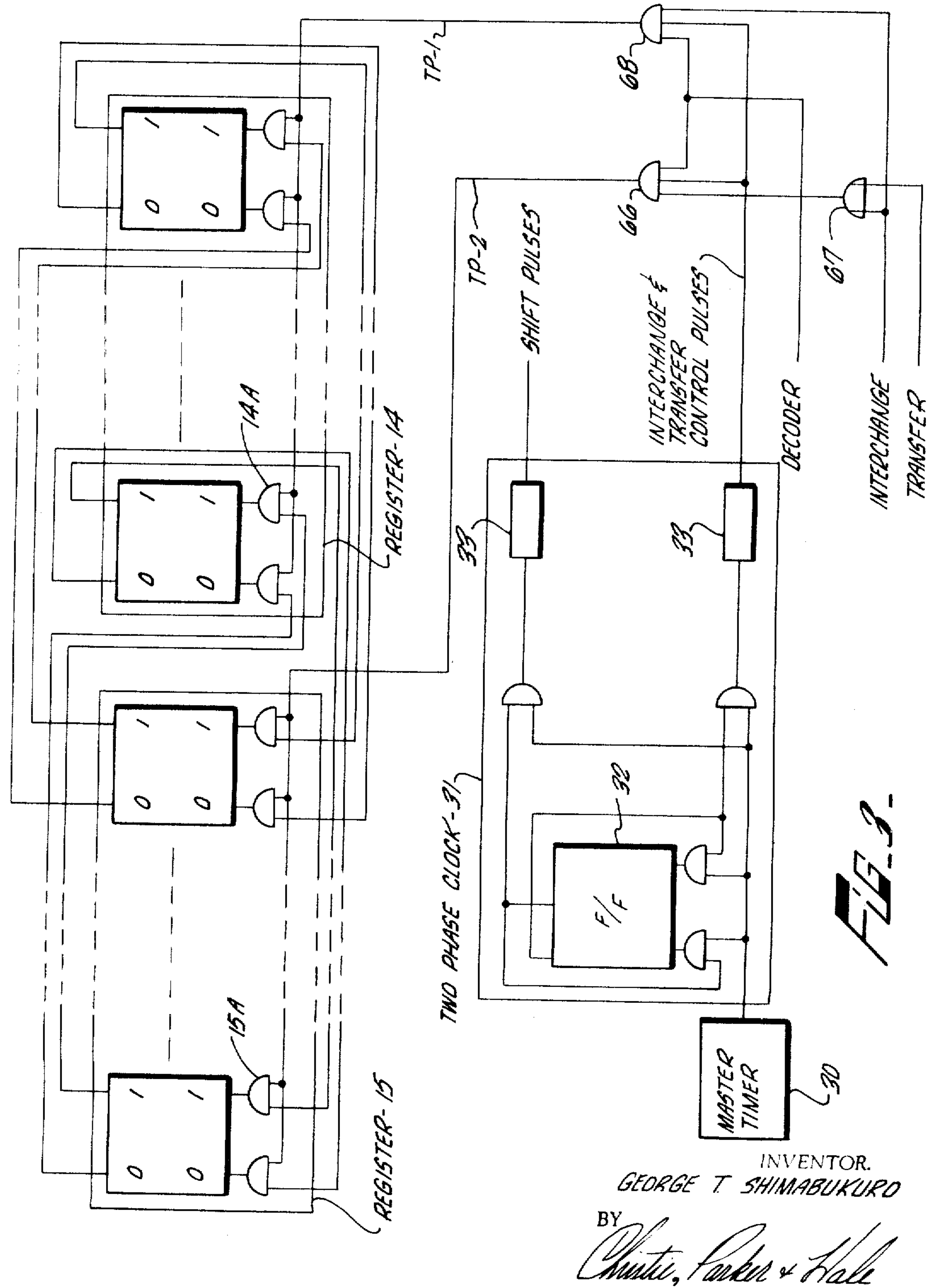
FIG. 3 is a schematic representation of one portion of the circuitry of this invention for performing a shifting operation in accordance with the principles of this invention.

This interchange operation is more fully disclosed by reference to FIG. 3 wherein the registers 14 and 15 are provided with interchange gates 14A and 15A, respectively. Each register of FIG. 3 has seven binary stages of which only two in each register are shown, and all of these stages are interconnected in the manner shown in FIG. 3. Thus, the output from the first stage of register 15 feeds the input gates 14A for the first stage of register 14, and the outputs of the first stage of register 14 feed the input gates 15A of the first stage of register 15. Simultaneous application of gating enabling pulses TP–1 and TP–2 effect an information interchange between these two stages. Similar connections between the remaining six stages of both shift registers 14 and 15 assures that the entire information stored in each shift register is interchanged for the information stored in the remaining shift register.

It should be understood, of course, that only the interchange gates and leads for registers 14 and 15 are shown in FIG. 3, and that other gates and leads are present for the read and write operation discussed hereinbefore, but such gates are so well known that no detailed discussion of this other circuitry is necessary. Also shown in FIG. 3 is the master timing clock which may advantageously be a crystal oscillator or other similar pulse generating device, that is adjusted to have a repetition rate twice the data rate for the delay memory and shift registers of the information loop. The output of this master generator 30 drives a two-phase clock circuit 31 which includes a complementing flip-flop 32, driver circuits 33, and associated logic gates which function in a manner well known to produce the shift pulses 110 of FIG. 5, and an interchange and transfer control pulse 119 of FIG. 5. These interchange and transfer control pulses 119 along with the proper decoder output and an interchange command from the processor 12 produce the timing pulses TP–1 and TP–2 from gates 66 and 68 which control the shift register interchange operation described hereinbefore.

Reference once again to FIG. 5 shows that this register interchange operation and the read operation from register 14 took place entirely between the time interval $T_{23}$ through $T_{24}$, and accordingly the shifting of information in the loop was never interrupted. This new and novel operation which has heretofore been accomplished in the prior art only by a considerable circuitry and wasting of associated time required to re-route all information from the loop, has been accomplished in accordance with the principle of this invention without ever once diverting the information from the circulating route, and furthermore, without even interrupting the shifting of that information in the loop.

*Destructive and non-destructive read and backspace from first and last information positions*

It is often desirable in digital data computers to have as circuit options either the option to read from the first information position, i.e., the top of the memory stack, or to read from the last information position, i.e., the bottom of the memory stack. The reason for these options is that if a series of digits are defined as one word that expresses a numerical value, certain arithmetical operations require recovery of the least significant digit, or in a second operation, require recovery of the most significant digit. The circuitry of this invention performs these operations in a dynamic memory system, without ever interrupting the flow of information in the memory loop as summarized by the last four rows of Table 1. These operations are all similar, and thus will not be discussed in detail.

Another significant reason for having, as an option for the processor, the ability to backspace information results directly from the non-destructive read which was described hereinbefore. In a non-destructive read operation each digit that is read from the information loop is transposed with the start character if the non-destructive read is from the first information position, or is transposed with the termination character, if the non-destructive read is from the last information position. After a series of such non-destructive read operations, it is often desirable to verify that the utilization circuit has correctly recovered the information that has been read from the dynamic memory. This verification requires that each previously read digit which is now preceding the start character be recovered a second time. A typical example of this operation would be to assume that the processor circuit commanded a non-destructive read for the memory circuit of this invention and that the circulating information was, prior to this non-destructive read, in the following form: A–1–2–3–4–*; 2–4–6–8–*; 1–3–5–7–Z. In this information pattern, the "*" is often referred to as a word mark in that it denotes that the preceding number of digits form one word.

The non-destructive read of the above information would have required that the processor command the memory circuit to perform four non-destructive read operations, one operation for each digit of the first word. Following this non-destructive read the information pattern would be as follows:

1–2–3–4–A–*–2–4–6–8–*–1–3–5–7–Z

A verification operation requires that the processor recognize, upon the next non-destructive read which would transpose the locations of the A and the word mark "*" in the information pattern, that this word mark represented the first word, of which verification was sought. Accordingly, the processor would, upon receipt of the "*," command that a read and backspace operation from the first position take place. Immediately prior to the backspace, an information pattern of 1–2–3–4–*–A–2–4–6–8–*–1–3–5–7–Z would exist in the information loop. A read and backspace operation would obtain, at the read portion of the read and backspace operation, the digit 2 which is the first digit of the second word. This digit 2 would be ignored by the processor because it is the first digit of the second word, as determined by the word mark which was previously recognized by the processor. Immediately following this read operation during which the digit 2 was ignored, the backspace operation occurs and the information pattern would be 1–2–3–4–A–*–2–4–6–8–*–1–3–5–7–Z. This read and backspace operation would be repeated four times and therefore the information pattern would be returned to the original position. A comparison circuit in the processor would compare, by well known prior art circuitry, that each of the backspaced digits of the originally recovered word verifies either that the original word recovered was correct or incorrect, as the case may be.

The foregoing Table 1 summarizes the circuit operations for the read and backspace operation from the first and last information position, and inasmuch as each facet of these operations has already been discussed in detail, no further discussion thereof is felt necessary. It should be noted that the non-destructive read on the last information position which is in row 6 of Table 1 is identical in every aspect to the read and backspace operation from the last information position which is in row 5 of Table 1; and, accordingly, the only difference for these two operations would be in the form of command from the processor.

A destructive read from the last information position is summarized in the last row of Table 1 and is only slightly different from the other operations described hereinbefore. A destructive read from the last information position requires that the termination character Z1 be sensed by the decoder AND gate 37 in order to allow a read operation via transfer gates 21 to take place from the information loop shift register 15. Inasmuch as this is a destructive read operation shift register 15 may be considered as having all its stages empty following this read operation. The information digits of the loop fill these empty spaces by performing, simultaneously with the read operation, a translocation operation of the contents of shift register 14 into the empty stages of shift register 15. This translocation operation is performed in a manner very similar to the interchange operation with the exception shown by OR gate 67 and AND gate 66 of FIG. 3. A translocation command from the processor is applied through OR gate 67 to enable only AND gate 66 of the timing control gate pair 66 and 68. This operation delivers a pulse on lead TP–2 which controls only the input gates 15A of shift register 15 in order to gate the information from shift register 14 into the stages of shift register 15. This transfer pulse TP–2 is of short duration because the original decoding operation required the terminate character Z1 to be in shift register 14. This terminate character Z1, however, is immediately transferred to shift register 15, and the decoder output of decoder AND gate 37 goes false. The momentary pulse on the shift inhibit leads of gates 27 and 28 is removed prior to the appearance of a subsequent shift pulse 110, and accordingly shifting of information in the loop is never interrupted.

As mentioned hereinbefore, memory delay lines are commercially available that store up to 50,000 information bits. This number of information bits, for example, could fill completely one information loop that would be available to the processor. It is essential in computer orientated programs to be able to determine the status of the information capacity of the memories associated with the computer. Prior art approaches as mentioned hereinbefore have relied solely on complex counting operations which involves considerable circuitry and further requires that all counters be synchronized in order to determine at which particular position a count was started so that once this position is again reached the counters have determined the status capacity of the loop.

In accordance with the principles of this invention, such complex and expensive circuitry is avoided by monitoring the outputs of the start and terminate character decoders in a simple and straightforward manner by coincident detector logic gates, and associated delay multivibrators, in a new and novel manner, in order to activate the correct one of a plurality of "full", "near-full", "empty", or "near-empty" indication circuits.

It was described earlier that an operational sequence for the memory of this invention required the original insertion of the start and terminate characters A and Z into the information loop shift registers 14 and 15. When these characters are adjacently positioned in these two registers it is, of course, an indication that the information loop is empty as far as other standard information is concerned. This empty status is indicated, in FIG. 4, by EMPTY indicator circuit 70 which may advantageously be a flip-flop well-known to the prior art that is placed in a preselected state by an input pulse from AND gate 71. This AND gate 71 is in the form of a coincidence detector which monitors the outputs A2 and Z1 and will have its input condition satisfied when the information loop is empty. EMPTY indicator 70 also is provided with a reset lead so that this circuit may be reset during the computer operations, each time that information is written into the information loop.

A FULL indicator circuit 72 is similarly driven by an AND GATE 73 and is activated by the inverse situation for the EMPTY operation. This inverse situation requires that the terminate character Z2 be present in the register 15 and the start character A1 be present in the register 14. When this condition exists, register 15 is gating out the terminate character Z2 just at the instant when register 14 is receiving the start character A1, and obviously the delay line is completely filled with information.

Figure 4:
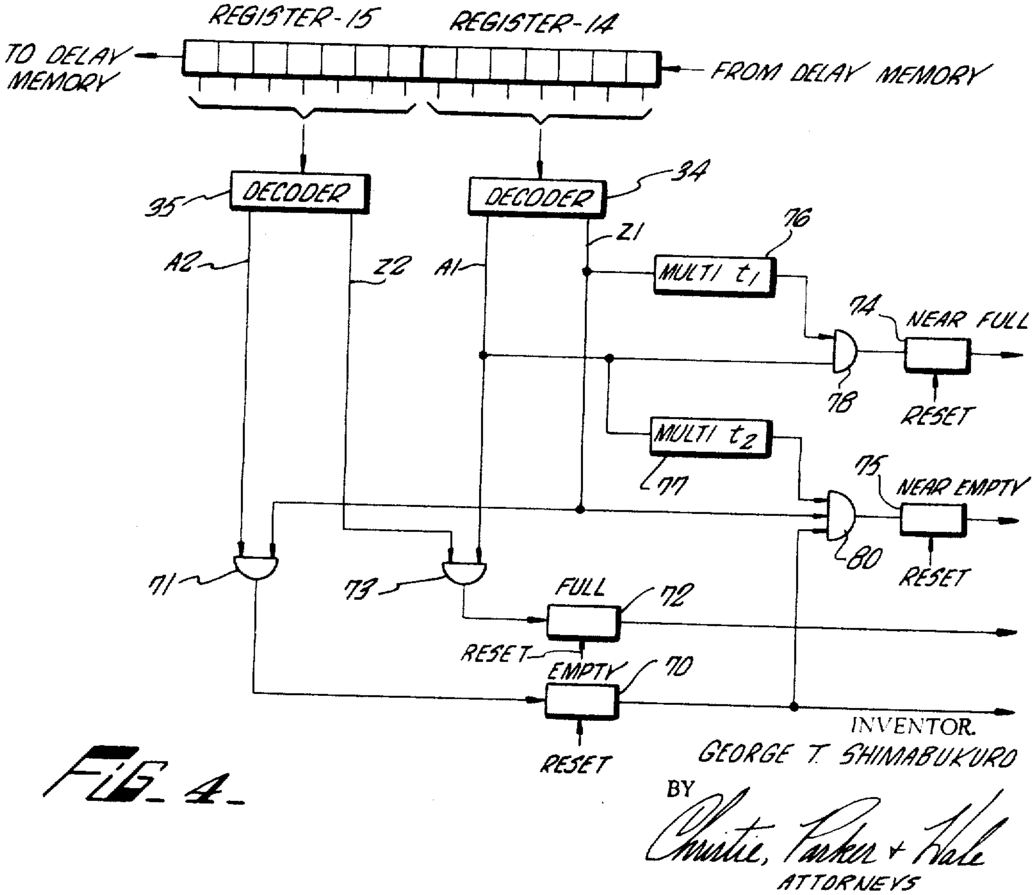
FIG. 4 is a schematic representation of a status indicating circuit for the circulating information loop of FIGS. 1 and 2.

Output leads from decoder 34 of FIG. 4 are also instrumental in driving a NEAR-FULL indicator circuit 74 and a NEAR-EMPTY indicator circuit 75. Each of these indicators have associated therewith a delay multivibrator 76 and 77, respectively. These delay multivibrators may be any of the type well known to the art.

Figure 6:
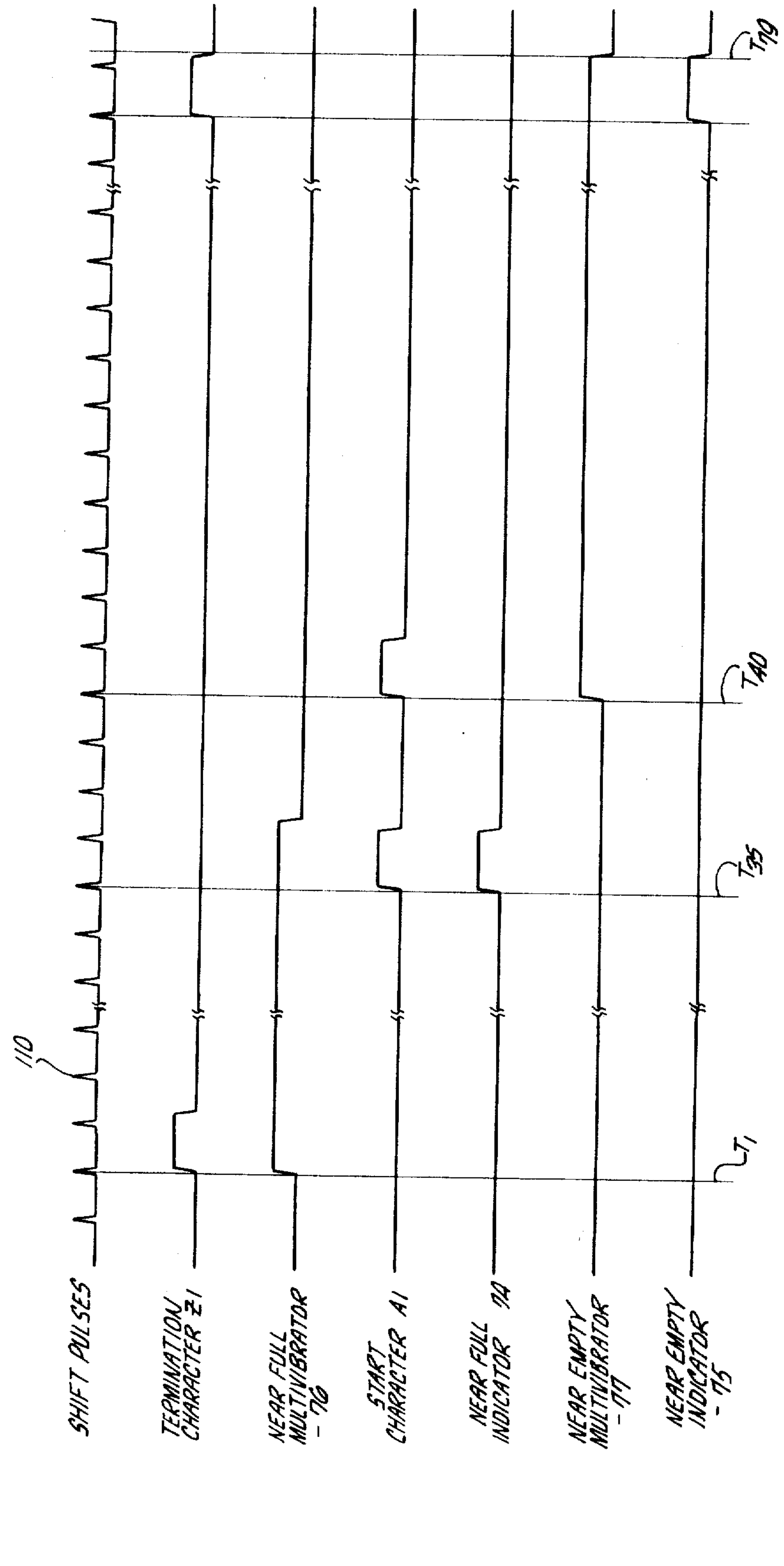
FIG. 6 is a timing chart and waveform diagram useful in depicting the circuit operation of FIG. 4.

Reference to FIG. 6 shows a typical delay period that can be chosen for the NEAR-FULL multivibrator 76. This multivibrator 76 is triggered on by a decoder output indication at time $T_1$ of FIG. 6, when the terminate character Z1 completely fills register 14. The delay period for multivibrator 76 is chosen to be slightly greater than two word intervals. Obviously, however, this choice of delay time will give an indication only when there is room in the information loop for just one more word (taking into account start character A1), and thus is merely a matter of choice. By lengthening the delay period of the multivibrator 76, or by using multiple delays, if necessary, a NEAR-FULL indication could be given at any other desired time. If the start character A1 is shifted into register 14 prior to the instant when the multivibrator 76 times out, as is shown for example at time interval $T_{35}$ of FIG. 6, then both output conditions for AND gate 78 are satisfied and its output will set the NEAR-FULL indicator circuit 74. This indicator circuit would be reset in a well-known manner, either prior to an unloading operation or immediately after that operation.

The NEAR-EMPTY indicator circuit 75 operates very similar to the NEAR-FULL indicator except that the enabling gate 80 which drives the NEAR-EMPTY indicator circuit 75 has an inhibit term from the output of EMPTY indicator 70. The NEAR-EMPTY multivibrator 77 is triggered on by the presence of start character A1 in register 14 as is shown at time interval $T_{40}$ of FIG. 6. The second input for AND gate 80 is derived when the terminate character Z1 is stored in register 14. If the time-out period for the NEAR-EMPTY multivibrator 77 is slightly longer than one word, merely for purposes of example, and there is one word only in the information loop, then the conditions for AND gate 80 are satisfied. In this instance the EMPTY indicator 70 is not set and thus the inhibit lead for AND gate 80 is not energized. Accordingly, the NEAR-EMPTY indicator would be set at time interval $T_{79}$ as shown in FIG. 6. This inhibit lead is necessary to prevent the NEAR-EMPTY indicator 75 from being set when the information loop is in fact empty.

It was mentioned in the introduction of this specification that although the principles of this invention were primarily directed to dynamic memories used in a stack memory operation, the principles of this invention are equally adaptable to memory operations in which any word or digit in the information pattern is desired rather than just the first or last information digit as is typical in a stack memory operation.

For example, if the utilization circuit for the memory of this invention were able to take information at the same character rate as the memory delay line, a readout operation as described hereinbefore could take place and rather than resuming shifting after recovery of seven bits which comprises the first digit, the bit counter would be preselected to have a sequence count equal to the number of bits in one word. For example, if the word contained five characters of seven bits each, the bit counter would inhibit shifting for a total of thirty-five shift pulses. This operation would transfer the entire word to the processor.

When a stack memory operation is involved, the first or last digit of information is the one which is always recovered first and by the use of word marks which are recognized by the processor, it is a simple matter to recognize in the processor when a word has been recovered. Accordingly, it is not necessary to provide a word counter in the circuitry of this invention. However, if it were desired to recover any designated word from among all the words within the information pattern, a word counter would be driven by selected outputs from bit counter 45 of FIG. 2. This word counter would have as many outputs as there are words available in the information loop and each output would be connected to a logic gate, the outputs of all of which, in turn, would be connected in common to the inhibit gates 27 and 28 and the transfer gates 21 and 22. Only the logic gate associated with the word which would be preselected by the processor would be enabled for a read or write operation. Although this word counter and the associated logic gates are not shown in FIG. 2, this operation is very similar to operations which are well known in the prior art and accordingly no further discussion of this word addressing technique is deemed necessary.

It is to be understood that the above described arrangements are illustrative of the principles of this invention. Numerous other arrangements may be devised by those skilled in the art without departing from the spirit and scope of this invention.

What is claimed is:

1. A system for storing binary information in series in a circulating loop, said circulating loop comprising a dynamic memory circuit for repeating each bit of binary input information at its output, said memory circuit being series-connected in said loop to first and second tandem-connected storage devices; timing means connected to said first and second storage devices for advancing all series information in said loop sequentially through said storage devices; means for inserting a start character uniquely coded from all other information into said loop to indicate the beginning point of a pattern of series information and also for inserting a terminate character uniquely coded from said start character and all other information into said loop for indicating the end point of said information pattern; first, second and third signal detecting devices; decoding means associated with said first and second storage devices and responsive to the presence of said start character in said second storage device for delivering an output signal to said second and said third signal detecting devices, a control circuit for delivering a destructive read command signal to said second detecting device, said second detecting device being responsive to said read command signal and said decoding output signal for generating an enabling signal, transfer gates connected between said first storage device and said control circuit, and means connecting the output of said signal detecting devices to said transfer gates and to said timing means and responsive to said second signal detecting means enabling signal for simultaneously enabling said transfer gates to read out information from said first storage device and for preventing the advancement of said start character from said second storage device until subsequent information from said dynamic memory refills said first storage device.

2. A system in accordance with claim 1 wherein said control circuit is further operative for delivering a non-destructive read command signal to said third detecting device, said third detecting device being responsive to said non-destructive read command signal and said decoding means output signal for generating an enabling signal, and wherein said system further comprises means for performing said read operation in a non-destructive manner including gating devices for interchanging the contents of said first and second storage devices, and means connected to said control circuit and said third detecting device and responsive to signals therefrom for enabling said interchange gating devices.

3. A system in accordance with claim 1 wherein said decoding means is further responsive to the presence of said terminate character in said first storage device for delivering an output signal to said first signal detecting device, and wherein said control circuit is operative for delivering a write command signal to said first detecting device, said first detecting device being responsive to said write command signal from said control circuit and to said output from said decoding means for generating an enabling signal, and wherein said connecting means is responsive to said enabling signal from said first signal detecting device for simultaneously preventing advancement of said terminate character in said first storage device only until said information in said second storage device has been advanced into said loop and new information inserted therein from said control circuit.

4. An information storage and retrieval system comprising a closed loop including a dynamic memory delay for continually circulating binary information, means for inserting into said circulating loop a unique binary encoded character for identifying the beginning and the end of an information pattern inserted in said loop between said characters, means associated with said inserting means for generating an output indication when either of said unique characters are circulated from said delay into said inserting means, and means connected to said last mentioned means and responsive to said output indication for altering the information content of said pattern in said inserting means immediately adjacent to said unique character while all information other than said unique character and said information to be altered is circulating in said delay.

5. An information storage and retrieval system including a loop for continually circulating information, said loop comprising a dynamic memory delay which is series connected to tandem storage means, means for addressing said information circulating loop comprising a circuit for inserting unique characters in said loop for identifying the beginning and end of information to be circulated therein, decoder means connected to said storage means for delivering output indications when either of said unique characters have been circulated through said dynamic memory and are stored in said storage means, and means responsive to said decoder output indications during the continual circulation of information in said loop for operating on information adjacent to said identifying characters.

6. An information storage and retrieval system comprising a closed loop including a dynamic memory device for continually circulating information in said loop, means in said loop and adapted for inserting into said loop a pair of unique signals marking the extremes of said circulating information, means connected to said inserting means for generating output signals when either of said marking signals is present in said inserting means, and means connected between said signal generating means and said inserting means and responsive to said generated signals for altering the information content while all information other than said unique character and said information to be altered is circulating in said memory.

7. An information storage and retrieval system in accordance with claim 6 wherein said dynamic memory device is a delay line having spaced apart input and output signal repeaters to continually circulate information in the form of a train of pulses received at the input repeater from said inserting means for re-entry into said loop by said output repeater.

8. An information storage and retrieval system in accordance with claim 7 wherein said inserting means includes first and second shift register circuits tandem-connected in said information loop to provide an input terminal for said input repeater and an output terminal for said output repeater, and wherein said system further comprises means for continually sequentially shifting said train of pulses through said registers.

9. An information storage and retrieval system in accordance with claim 8 wherein said output signal generating means comprises a pair of decoding means, one for each unique character, one each of said pair connected to monitor the outputs of said first and second shift registers and to deliver an output signal only when said unique character is fully stored in said first or said second shift registers.

10. An information storage and retrieval system in accordance with claim 9 and further comprising a control circuit having an output lead for applying read or write command signals to said system, and wherein said information altering means comprises a detector means connected to the output leads of said decoding means and to said control circuit, said detector means being responsive to coincidence of signals from said control circuit and said decoding means for applying an information altering signal to said first and second shift register circuits.

11. An information storage and retrieval system comprising a closed loop including a dynamic memory delay for continually circulating binary information, first means connected in said loop and adapted for inserting a unique binary encoded start character identifying the beginning of a circulating random information pattern, second means connected in said loop and adapted for inserting into said circulating loop a unique binary encoded terminate character identifying the end of said random information pattern, character advancing means connected to said first and second inserting means for continually advancing said unique characters and said random information between said characters in said loop, means associated with said second inserting means for generating an output indication when said start character is circulated into said second inserting means, and means responsive to said output indication for recovering said random information stored in said first inserting means.

12. An information storage and retrieval system in accordance with claim 11 and further comprising an inhibiting device connected between said information advancing means and said second inserting means, said inhibiting device being connected to said generating means and activated by said output indication therefrom for preventing advancement of said start character from said second inserting means until other random information from said memory circuit replaces information recovered from said first inserting means.

13. An information storage and retrieval system in accordance with claim 12 and further comprising means for deactivating said inhibit means when said first inserting means is refilled by said memory circuit whereby said continual advancement of all information in said circulating loop is resumed.

14. An information storage and retrieval system comprising a closed loop including a dynamic memory delay for continually circulating binary information, first means connected in said loop for inserting a unique binary encoded character identifying the beginning of a circulating random information pattern, second means connected in said loop for inserting into said circulating loop a unique binary encoded character identifying the end of said random information pattern, character advancing means connected to said first and second inserting means for continually advancing said unique characters and said random information between said characters in said loop, means associated with said first inserting means for generating an output indication when said character identifying the end of said information pattern is circulated into said first inserting means, and means responsive to said output indication for advancing said information stored in said second inserting means into said information loop until said second inserting means is empty and thereafter for storing new information in said second inserting means.

15. An information storage and retrieval system in accordance with claim 14 and further comprising inhibit means connected between said information advancing means and said first inserting means, said inhibiting means being activated by said output indication for preventing advancement of said identifying character from said first inserting means while said advancement and refilling of said second inserting means is taking place.

16. An information storage and retrieval system in accordance with claim 15 further comprising means for deactivating said inhibit means when said second inserting means is refilled by said storage means whereby advancement of said new information pattern in said circulating loop is resumed.

17. An information storage and retrieval system comprising a closed loop including a dynamic memory delay capable of storing a fixed maximum amount of circulating binary information, first means connected in said loop for inserting, in addition to random information, a unique binary encoded start character identifying the beginning of said random information, second means connected in said loop for inserting in addition to said random information a unique terminate character identifying the end of said random information, binary information advancing means connected to said first and second inserting means, means associated with said first inserting means for generating a first output signal when said terminate character is circulated into said first inserting means, means associated with said second inserting means for generating a second output signal when said start character is circulated into said second inserting means, and means responsive to the order and time of respective appearances of said first and second output signals for indicating the capacity status of said memory.

18. An information storage and retrieval system in accordance with claim 17 wherein said memory capacity status indicating means comprises a first bi-stable circuit also set normally in a first state and capable of assuming a second state indicative of an empty status capacity in said memory, and first coincident signal detection means connected between said first and second output signal generating means and said bi-stable circuit for causing said circuit to assume said second state when said start and terminate characters simultaneously appear in said first and second inserting means in their original insert order.

19. In accordance with claim 17 wherein said memory capacity status indicating means comprises a second bi-stable circuit also set normally in a first state and capable of assuming a second state indicative of a full information status capacity in said memory, and second coincident signal detection means connected between said first and second output signal generating means for placing said second bi-stable circuit in said second state when said start and terminate characters simultaneously appear in said first and second inserting means in an order of appearance opposite to said original insert order.

20. An information storage and retrieval system comprising a closed loop including a dynamic memory delay for continually circulating binary information, first means connected in said loop for inserting a unique binary encoded start character identifying the beginning of a circulating radom information pattern, second means for inserting into said circulating loop a unique binary encoded terminate character identifying the end of said random information pattern, character advancing means connected to said first and second inserting means for continually advancing said unique characters and said random information between said characters in said loop, means associated with said first inserting means for generating respectively first and second output signals when said start and said terminate characters are circulated into said first inserting means, a first delay multivibrator having a predetermined time delay connected to said output signal delivering means and responsive to said first output signal for initiating its timing cycle, a circuit for indicating when said memory information capacity is near empty, a first coincident logic gate connected to said first delay multivibrator and to said output signal delivery means and responsive to said second output indication during said timing cycle for activating said near-empty indicating circuit.

21. An information storage and retrieval system in accordance with claim 20 and further comprising a circuit for indicating when said memory information capacity is near full, a second delay multivbrator having a predetermined time delay connected to said output delay means and responsive to said second output signal for initiating its timing cycle, a second coincident logic gate connected to second delay multivibrator and to said output delay means and responsive to said first output indication during said timing cycle of said second multivibrator for activating said near full indicating circuit.

22. An information storage and retrieval system for storing binary information in series in a circulating loop comprising a dynamic memory circuit for repeating each bit of binary input information at its output, said storage loop further comprising first and second shift registers tandem connected and in series with said memory circuit, said shift registers each having a plurality of stages for storing a fixed number of binary digits which form one information character for each register, a source of continually appearing shift control pulses applied to said first and second registers for sequentially and repetitively advancing each bit stored in series in said registers into said dynamic memory, means for inserting a start character uniquely coded from all other information into one of said registers to indicate the beginning point of an information pattern in said loop and also for inserting a terminate character uniquely coded from said start character and all other information into said loop for indicating the end of said information pattern, first and second signal detecting devices, first and second character decoding means connected respectively between said first and second registers and said first and second detecting devices, said first and second character decoding means being responsive to the presence of said start character in said first and second registers respectively for delivering output signals to said first and second signal detecting devices, a control circuit for delivering command signals to said first and second signal detecting devices, means activatingly operative for recovering an information character stored in said first shift register, and means connected between said first and second detecting devices and said signal recovery means for activating said recovery means upon coincidence of a command and a character decoding output signal at said second detecting means.

23. An information storage and retrieval system in accordance with claim 22 wherein said dynamic memory circuit comprises a delay line having a data rate equal to the repetition rate of said shift control pulses and further having spaced apart input and output signal repeating devices respectively connected to the input and output information leads of said tandem-connected shift registers.

24. An information storage and retrieval system in accordance with claim 23 wherein said first and second signal detecting devices comprise first and second coincidence gates.

25. An information storage and retrieval system in accordance with claim 24 wherein said means for activating said information recovering means comprises a bi-stable device connected to said coincidence gates and responsive to an output from either of said gates for assuming a state indicative of an information altering operation, counting means connected to said bi-stable device and said shift control source and responsive to said assumption of an information altering state for thereafter counting each of said shift control pulses through a sequence equal to the number of binary digits of one information character, first and second normally conductive gating means connected between said shift conrtol source and said first and second shift registers, each of said gating devices having associated therewith an inhibit lead, first means connecting said bi-stable device to said inhibit lead of said gate associated with said second shift register for inhibiting shifting of said second register for the duration of said sequence count, and means connecting the output of said counting means to said bi-stable device for placing said bi-stable device in a second state following said sequence count.

26. An information storage and retrieval system in accordance with claim 25 and further comprising means for storing a character of information in said second shift register, and wherein said activating means is further connected between said detecting device and said character storing means and further comprises second means connecting said bi-stable device to said inhibit leads of said gate associated with said first shift register for inhibiting shifting of said first register for the duration of said sequence count, said activating means being responsive to the completion of said sequence count for completing said information storage operation between said character storing means and said second shift register.

References Cited

UNITED STATES PATENTS

| | | | |
|---|---|---|---|
| 2,947,867 | 8/1960 | Lenty et al. | 235—160 |
| 3,181,123 | 4/1965 | Wright et al. | 340—172.5 |
| 3,257,645 | 6/1966 | Lekven | 340—172.5 |

ROBERT C. BAILEY, *Primary Examiner.*

I. S. KAVRUKOV, *Assistant Examiner.*

UNITED STATES PATENT OFFICE

CERTIFICATE OF CORRECTION

Patent No. 3,351,917

November 7, 1967

George T. Shimabukuro

It is hereby certified that error appears in the above numbered patent requiring correction and that the said Letters Patent should read as corrected below.

Column 2, line 13, for "attemps" read -- attempts --; line 15, for "letter" read -- latter --; columns 5 and 6, TABLE 1, second column, line 5 thereof, for "A-1-2-3-4-Z-5" read -- A-1-2-3-4-5-Z --; same table, third column, line 5 thereof, for "A-1-2-3-4-5-Z" read -- A-1-2-3-4-Z-5 --; column 12, line 36, for "GATE" read -- gate --; column 14, lines 3 and 4, for "informaiton" read -- information --; column 17, line 2, strike out "also"; line 49, for "multivbrator" read -- multivibrator --; column 18, line 42, for "conrtol" read -- control --.

Signed and sealed this 11th day of February 1969.

ƽEAL)

.ttest:

dward M. Fletcher, Jr.

ttesting Officer

EDWARD J. BRENNER

Commissioner of Patents